(12) United States Patent
Gong et al.

(10) Patent No.: US 11,287,993 B2
(45) Date of Patent: Mar. 29, 2022

(54) METHOD, DEVICE, AND COMPUTER PROGRAM PRODUCT FOR STORAGE MANAGEMENT

(71) Applicant: EMC IP Holding Company LLC, Hopkinton, MA (US)

(72) Inventors: Shaoqin Gong, Beijing (CN); Jibing Dong, Beijing (CN); Hongpo Gao, Beijing (CN); Jianbin Kang, Beijing (CN); Baote Zhuo, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 78 days.

(21) Appl. No.: 16/748,300

(22) Filed: Jan. 21, 2020

(65) Prior Publication Data
US 2021/0117087 A1  Apr. 22, 2021

(30) Foreign Application Priority Data
Oct. 21, 2019 (CN) .......................... 201911001384.8

(51) Int. Cl.
*G06F 12/00* (2006.01)
*G06F 3/06* (2006.01)
*G06F 9/54* (2006.01)
*G06F 9/46* (2006.01)

(52) U.S. Cl.
CPC ............ *G06F 3/064* (2013.01); *G06F 3/0619* (2013.01); *G06F 3/0653* (2013.01); *G06F 3/0659* (2013.01); *G06F 3/0673* (2013.01); *G06F 9/466* (2013.01); *G06F 9/542* (2013.01); *G06F 9/546* (2013.01)

(58) Field of Classification Search
None
See application file for complete search history.

(56) References Cited

U.S. PATENT DOCUMENTS

| | | |
|---|---|---|
| 8,935,446 B1 | 1/2015 | Shilane et al. |
| 9,189,402 B1 | 11/2015 | Smaldone et al. |
| 9,189,414 B1 | 11/2015 | Shim et al. |
| 9,304,914 B1 | 4/2016 | Douglis et al. |
| 9,336,143 B1 | 5/2016 | Wallace et al. |
| 9,390,116 B1 | 7/2016 | Li et al. |
| 10,872,037 B2 | 12/2020 | Noto et al. |
| 11,010,054 B1 | 5/2021 | Himelstein et al. |
| 11,068,390 B2 | 7/2021 | Shilane et al. |
| 2015/0347310 A1* | 12/2015 | Ish ...................... G06F 12/0871 711/3 |
| 2020/0027512 A1* | 1/2020 | Yun ........................ G11C 16/22 |

* cited by examiner

*Primary Examiner* — Daniel D Tsui
(74) *Attorney, Agent, or Firm* — BainwoodHuang (57) ABSTRACT

Techniques involve: determining corresponding valid metadata rates of a plurality of metadata blocks stored in a metadata storage area of a storage system, the valid metadata rate of each metadata block indicating a ratio of valid metadata in the metadata block to all metadata in the metadata block; selecting a predetermined number of metadata blocks having a valid metadata rate lower than a first valid metadata rate threshold from the plurality of metadata blocks; storing valid metadata in the predetermined number of metadata blocks into at least one metadata block following the plurality of metadata blocks in the metadata storage area; and making the valid metadata in the predetermined number of metadata blocks invalid. Accordingly, such techniques can improve the efficiency of the storage system.

20 Claims, 9 Drawing Sheets

METHOD, DEVICE, AND COMPUTER PROGRAM PRODUCT FOR STORAGE MANAGEMENT

CROSS-REFERENCE TO RELATED APPLICATION

This application claims priority to Chinese Patent Application No. CN201911001384.8, on file at the China National Intellectual Property Administration (CNIPA), having a filing date of Oct. 21, 2019, and having "METHOD, DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure generally relate to the field of storage, and more particularly to a method, a device, and a computer program product for storage management.

BACKGROUND

Currently, a storage system is designed to be simple, high-performance, and economical. Such a storage system is capable of supporting next-generation storage media and has an architecture capable of scale-up and scale-out, a flexible consumption model, and a high degree of simplicity. However, with rapid development of information technologies, the requirements for a storage system are increasingly high. Therefore, there is a need for a solution that can further improve the performance of a storage system.

SUMMARY OF THE INVENTION

The embodiments of the present disclosure provide an improved solution for storage management.

In a first aspect of the present disclosure, a method for storage management is provided. The method includes: determining corresponding valid metadata rates of a plurality of metadata blocks stored in a metadata storage area of a storage system, the valid metadata rate of each metadata block indicating a ratio of valid metadata in the metadata block to all metadata in the metadata block; selecting a predetermined number of metadata blocks having a valid metadata rate lower than a first valid metadata rate threshold from the plurality of metadata blocks; storing valid metadata in the predetermined number of metadata blocks into at least one metadata block following the plurality of metadata blocks in the metadata storage area; and making the valid metadata in the predetermined number of metadata blocks invalid.

In a second aspect of the present disclosure, a device for storage management is provided. The device includes at least one processing unit and at least one memory. The at least one memory is coupled to the at least one processing unit and stores instructions to be executed by the at least one processing unit. The instructions, when executed by the at least one processing unit, cause the device to perform an action, the action including: determining corresponding valid metadata rates of a plurality of metadata blocks stored in a metadata storage area of a storage system, the valid metadata rate of each metadata block indicating a ratio of valid metadata in the metadata block to all metadata in the metadata block; selecting a predetermined number of metadata blocks having a valid metadata rate lower than a first valid metadata rate threshold from the plurality of metadata blocks; storing valid metadata in the predetermined number of metadata blocks into at least one metadata block following the plurality of metadata blocks in the metadata storage area; and making the valid metadata in the predetermined number of metadata blocks invalid.

In a third aspect of the present disclosure, a computer program product is provided. The computer program product is tangibly stored in a non-transitory computer-readable medium and includes machine-executable instructions that, when executed, cause a machine to implement any of the steps of the method described according to the first aspect of the present disclosure.

The Summary of the Invention is provided to introduce the selection of concepts in a simplified form, which will be further described in the Detailed Description below. The Summary of the Invention is not intended to identify key features or essential features of the present disclosure, and also is not intended to limit the scope of the present disclosure.

BRIEF DESCRIPTION OF THE DRAWINGS

The above and other objects, features, and advantages of the present disclosure will become more apparent from the detailed description of example embodiments of the present disclosure in conjunction with the accompanying drawings, where in the example embodiments of the present disclosure, the same reference numerals usually represent the same parts.

In the various figures, the same or corresponding reference numerals indicate the same or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While preferred embodiments of the present disclosure have been shown in the drawings, it should be understood, however, that the present disclosure may be implemented in various forms and should not be limited by the embodiments set forth herein. In contrast, the embodiments are provided to make the present disclosure more thorough and complete and fully convey the scope of the present disclosure to those skilled in the art.

The term "include" and its variants as used herein mean open-ended inclusion, i.e., "including but not limited to." Unless specifically stated, the term "or" means "and/or." The term "based on" means "based at least in part on." The terms "one exemplary embodiment" and "one embodiment" mean "at least one example embodiment." The term "another embodiment" means "at least one additional embodiment." The term "first," "second," etc. may refer to different or identical objects. Other clear and implicit definitions may also be included below.

A storage system includes a plurality of storage strips that provide redundant storage. Metadata for the plurality of storage strips is stored in a memory in association with the storage system as a plurality of entries. For example, the metadata may include the online condition of the storage strips, the distribution of storage blocks in the storage strips, etc. Each of the plurality of entries is written into a metadata storage space of the storage system by at least one transaction, more specifically, into one or more metadata blocks in a metadata storage area in the metadata storage space.

When the metadata is changed, the metadata block containing the changed metadata is attached to the tail of all metadata blocks in the metadata storage area. This can ensure the integrity of the changed metadata in the metadata block, i.e., either none of the changed metadata is stored, or all the changed metadata is stored.

As metadata blocks are continually attached to the metadata storage area, a utilization rate of the metadata storage area is increasing. The utilization rate indicates a ratio of a space in which metadata blocks are stored in the metadata storage area to the total space in the metadata storage area. Traditionally, when the utilization rate of the metadata storage area exceeds a utilization rate threshold (e.g., 70%), all metadata in the memory needs to be stored into the metadata storage area in one transaction to replace the metadata previously stored in the metadata storage area. This process may be called compression. However, storing all metadata in the memory into the metadata storage area in one transaction will result in excessive metadata being stored once. This not only easily causes errors, but also causes delays in response to other service requests.

According to an example embodiment of the present disclosure, an improved solution for storage management is proposed. In this solution, corresponding valid metadata rates of a plurality of metadata blocks stored in a metadata storage area of a storage system are determined. The valid metadata rate of each metadata block indicates a ratio of valid metadata in the metadata block to all metadata in the metadata block. A predetermined number of metadata blocks having a valid metadata rate lower than a first valid metadata rate threshold are selected from the plurality of metadata blocks. Valid metadata in the predetermined number of metadata blocks is stored into at least one metadata block following the plurality of metadata blocks in the metadata storage area, and the valid metadata in the predetermined number of metadata blocks is made invalid.

In this way, the compression process is divided into multiple iterations, each iteration storing only a small amount of metadata into the metadata storage area, thereby keeping the utilization rate of the metadata storage area at a reasonable level (e.g., 40%-70%), improving the performance of the storage system, and reducing the loss of a disk (e.g., a solid-state drive (SSD)).

Figure 1:
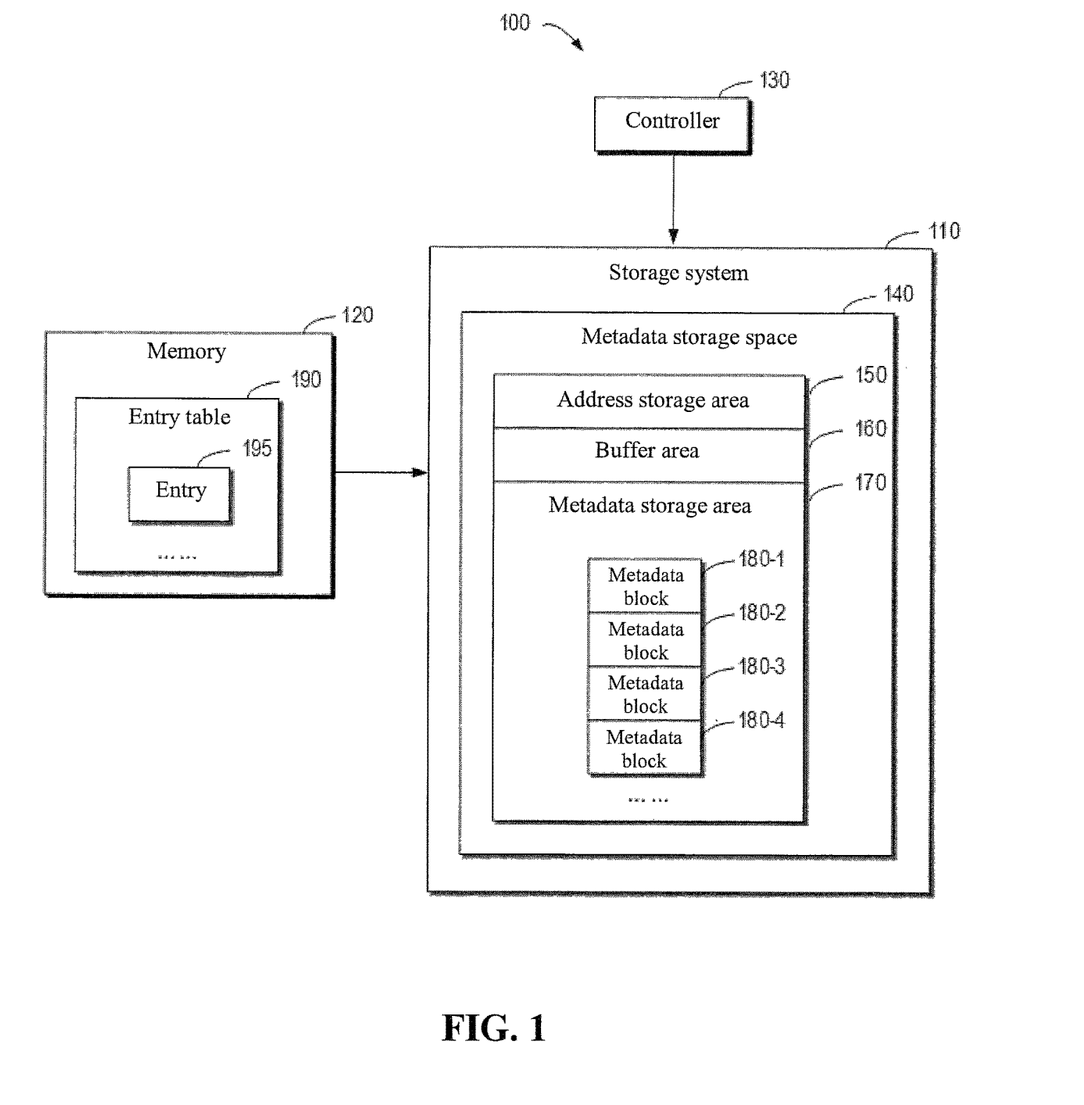
FIG. 1 shows a schematic diagram of an example of a storage environment in which some embodiments of the present disclosure can be implemented.

In the following, a specific example of this solution will be described in more detail in conjunction with FIGS. 1 to 10. FIG. 1 shows a schematic diagram of an example of storage environment 100 in which some embodiments of the present disclosure can be implemented. Storage management environment 100 includes storage system 110, memory 120, and controller 130.

Figure 2:
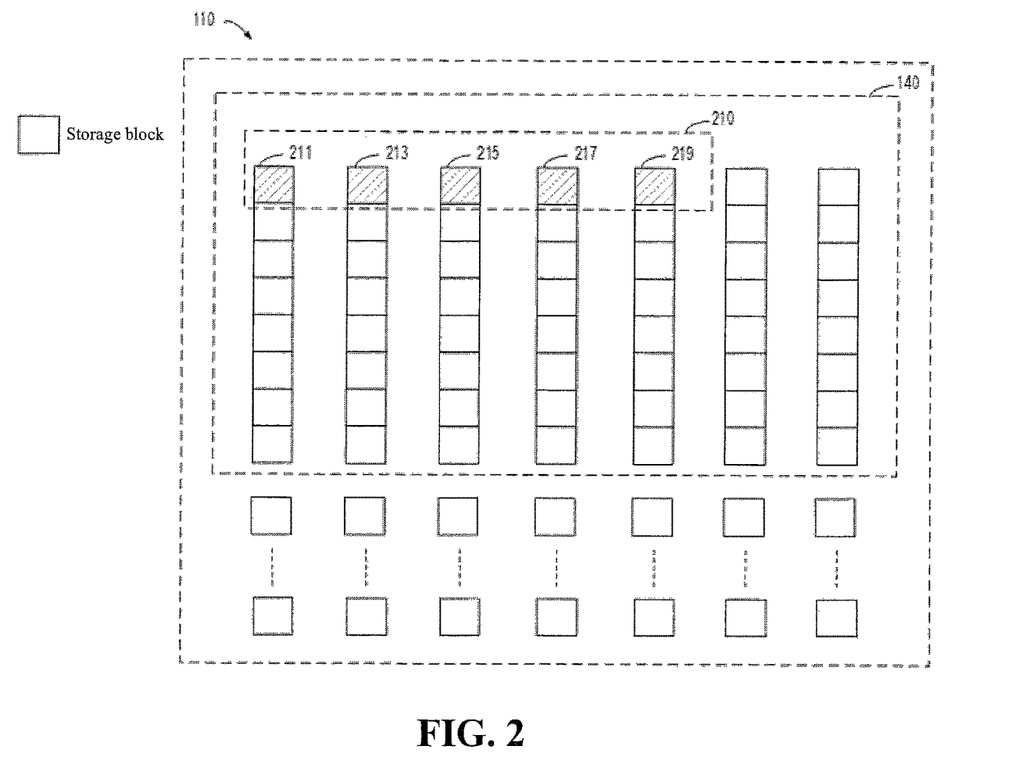
FIG. 2 shows a schematic diagram of an example of a storage system according to some embodiments of the present disclosure.

For ease of understanding, storage system 110 is described with reference to FIG. 2. FIG. 2 shows a schematic diagram of an example of storage system 110 according to some embodiments of the present disclosure. As shown in FIG. 2, storage system 110 may be divided into a plurality of storage blocks. Storage system 110 supports dynamic allocation of storage. To this end, a hardware storage apparatus such as a disk drive may be divided into storage blocks of a fixed size (e.g., 4 GB). When a user needs more storage, the storage system may allocate storage blocks on different hardware storage apparatuses for the user.

The plurality of storage blocks may form a storage strip. For example, storage blocks 211, 213, 215, 217, and 219 may constitute storage strip 210, etc. Storage strip 210 may provide functions of a redundant array of independent disks (RAID). The plurality of storage strips form a storage space accessible to a user, such as metadata storage space 140. It should be understood that only metadata storage space 140 is shown in FIG. 2 for ease of understanding. However, in addition to metadata storage space 140, storage system 110 may have storage spaces for various purposes, such as a user data storage space, a mapper storage space, a log storage space, etc.

Referring back to FIG. 1, metadata storage space 140 is a special storage space. It stores metadata in other storage spaces. For example, the metadata may include the online condition of a storage strip that provides redundant storage in storage system 110, the distribution of individual storage blocks in the storage strip, etc. Metadata is stored from memory 120 into storage system 110. Specifically, metadata for one storage space (e.g., metadata storage space 140) is stored in memory 120 as entry table 190. Entry table 190 includes a plurality of entries 195, each entry 195 being metadata for one storage strip (e.g., storage strip 210). Each entry 195 is written into metadata storage space 140 of storage system 110 by at least one transaction. The metadata of metadata storage space 140 itself is stored on the top of the hardware storage apparatus, such as in storage blocks 211, 213, 215, 217, and 219.

Metadata storage space 140 may include three parts: address storage area 150, buffer area 160, and metadata storage area 170. Address storage area 150 may be used to store address information, such as an address of buffer area 160 and a header address and a tail address of metadata storage area 170. Buffer area 160 may be used to buffer changed metadata to accumulate the changed metadata to the size of buffer area 160, and store the buffered changed metadata into metadata storage area 170 as a metadata block, such as metadata blocks 180-1 to 180-4 (hereinafter, collectively referred to as "metadata block 180").

Metadata storage area 170 will typically occupy most of metadata storage space 140. The metadata block in metadata storage area 170 is stored between the header address and the tail address. In an initial phase, the metadata block in metadata storage area 170 contains only valid metadata. When metadata is changed (for example, the online condition of the storage strip is changed, e.g., from online to offline), the changed metadata is attached to the tail of buffer area 160. When the changed metadata is accumulated to the size of buffer area 160 (also the size of metadata block 180), metadata block 180 containing the changed metadata is attached to the current tail of all metadata blocks 180 in metadata storage area 170, that is, at the tail address. In addition, the header address and the tail address will also be updated to a new address. It can be understood that since the changed metadata is attached to metadata storage area 170, the old metadata corresponding to the changed metadata becomes invalid metadata.

As new metadata blocks are continually attached to metadata storage area 170, the utilization rate of metadata storage area 170 is increasing. The utilization rate indicates a ratio of a space in which metadata blocks 180 are stored in metadata storage area 170 to the total space in metadata storage area 170. In order to keep the utilization rate of metadata storage area 170 at a reasonable level, controller 130 may control storage system 110 for compression. As shown in FIG. 1, controller 130 is implemented outside storage system 110. Alternatively, controller 130 may be implemented inside storage system 110, its implementation location being not limited. Controller 130 may include, but is not limited to, a cloud computing device, a mainframe computer, a server, a personal computer, a desktop computer, a laptop computer, a tablet computer, a personal digital assistant and any other computing capable device. The operations performed by controller 130 will be described in detail below with reference to FIGS. 3-9.

Figure 3:
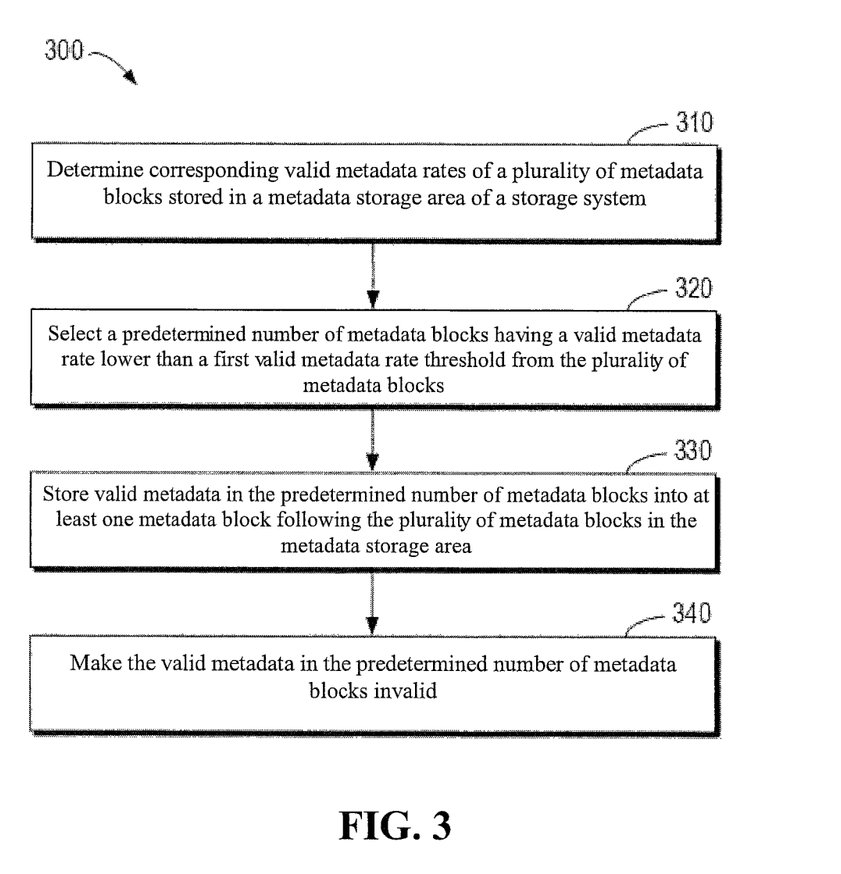
FIG. 3 shows a flowchart of a method for storage management according to some embodiments of the present disclosure.

FIG. 3 shows a flowchart of method 300 for storage management according to some embodiments of the present disclosure. For example, method 300 may be carried out by controller 130 as shown in FIG. 1. It should be understood that method 300 may also include additional steps not shown and/or the steps shown may be omitted, the scope of the present disclosure being not limited in this respect. For ease of understanding, method 300 will be described with reference to FIGS. 4-9.

At 310, controller 130 determines corresponding valid metadata rates of a plurality of metadata blocks (e.g., metadata blocks 180-1 to 180-4, 550, and 560) stored in metadata storage area 170 of storage system 110. The valid metadata rate of each metadata block indicates a ratio of valid metadata in the metadata block to all metadata in the metadata block. For example, if a ratio of valid metadata to all metadata in metadata block 180-1 is 30%, the valid metadata rate of metadata block 180-1 indicates 30%.

Figure 4:
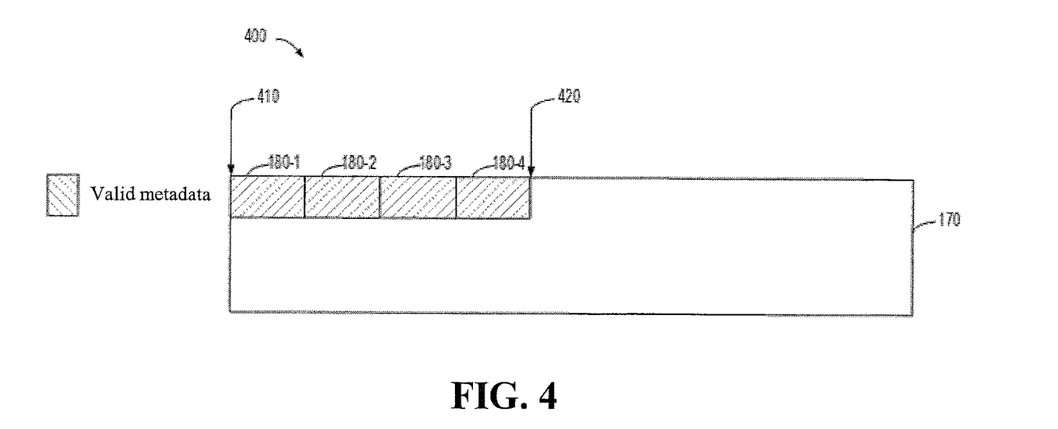
FIG. 4 shows a schematic diagram of an example of a metadata block in a metadata storage area in an initial phase according to some embodiments of the present disclosure.
Figure 5:
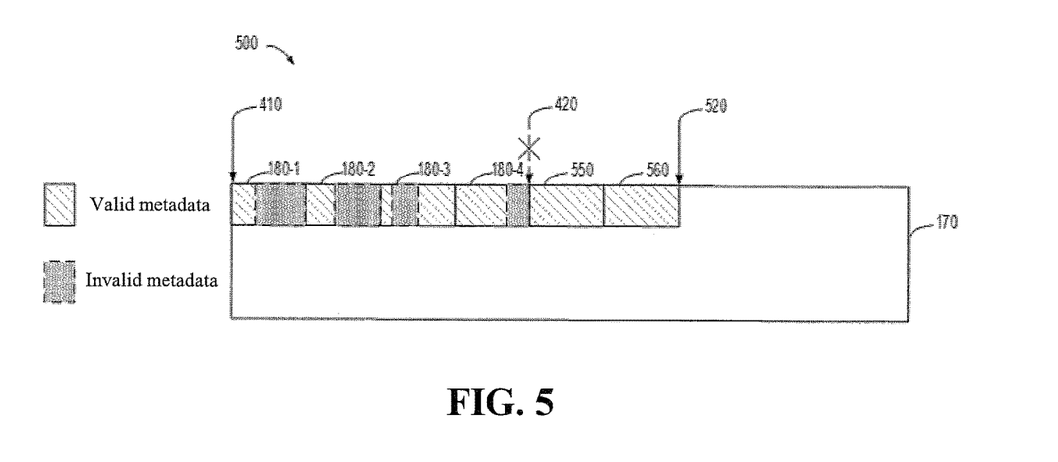
FIG. 5 shows a schematic diagram of an example of a metadata block in a metadata storage area after a new metadata block is attached according to some embodiments of the present disclosure.

For ease of understanding, valid metadata and invalid metadata in metadata block 180 will be described with reference to FIGS. 4 and 5. FIG. 4 shows schematic diagram 400 of an example of a metadata block in a metadata storage area in an initial phase according to some embodiments of the present disclosure. As shown in FIG. 4, in the initial phase, metadata blocks 180-1 to 180-4 between header address 410 and tail address 420 in metadata storage area 170 contain only valid metadata.

As mentioned above, changed metadata is continually attached to metadata storage area 170, and old metadata corresponding to the changed metadata becomes invalid metadata. FIG. 5 shows schematic diagram 500 of an example of a metadata block in a metadata storage area after a new metadata block is attached according to some embodiments of the present disclosure. As shown in FIG. 5, new metadata blocks 550 and 560 are attached, and tail address 420 is updated to tail address 520. In addition, since metadata blocks 550 and 560 contain the changed metadata, some of the valid metadata in metadata blocks 180-1 to 180-4 become invalid metadata.

In some embodiments, controller 130 may determine the utilization rate of metadata storage area 170. The utilization rate indicates a ratio of a space in which metadata blocks are stored in metadata storage area 170 to the total space in metadata storage area 170. For example, if the space occupied by metadata blocks 180-1 to 180-4, 550, and 560 accounts for 80% of the total space of metadata storage area 170, the utilization rate indicates 80%.

Controller 130 may compare the utilization rate with a utilization rate threshold. In the case where the utilization rate exceeds the utilization rate threshold, controller 130 may determine corresponding valid metadata rates of metadata blocks 180-1 to 180-4, 550, and 560. In this way, it is possible to avoid too frequent compression in the case where metadata storage area 170 has sufficient space remaining.

Figure 6:
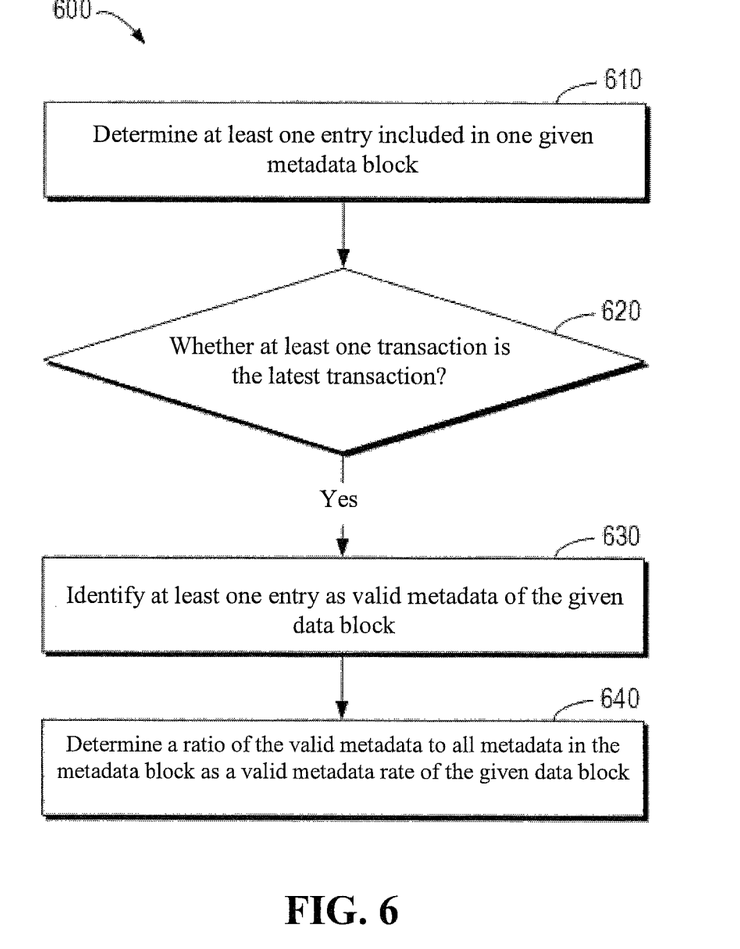
FIG. 6 shows a flowchart of a method for determining a valid metadata rate according to some embodiments of the present disclosure.

FIG. 6 shows flowchart 600 of a method for determining a valid metadata rate according to some embodiments of the present disclosure. For example, method 600 may be carried out by controller 130 as shown in FIG. 1. It should be understood that method 600 may also include additional steps not shown and/or the steps shown may be omitted, the scope of the present disclosure being not limited in this respect.

At 610, for a given one (e.g., metadata block 180-1) of the plurality of metadata blocks 180-1 to 180-4, 550, and 560, controller 130 may determine at least one entry included in metadata block 180-1. At 620, controller 130 may determine whether a transaction for writing the entry into metadata block 180-1 is the latest transaction for the entry.

In some embodiments, controller 130 may obtain an entry table and entries in the entry table (e.g., which may be represented as a tuple {entry table, entry}), and a mapping relationship between a metadata block that stores an entry and the latest transaction for writing the entry into the metadata block (e.g., which may be represented as a tuple {metadata block, transaction}), such as a hash mapping relationship. For a given tuple {entry table, entry}, its corresponding tuple {metadata block, transaction} may be determined. In addition, when a new transaction writes an entry into a new metadata block, the tuple {metadata block, transaction} may be updated to {new metadata block, new transaction}.

For example, recent transaction 1 writes entry 195 in entry table 190 into metadata block 180-1. In this case, the tuple {entry table 190, entry 195} is mapped to the tuple {metadata block 180-1, transaction 1}. Thereafter, new transaction 2 later than transaction 1 writes entry 195 in entry table 190 into metadata block 550. In this case, the tuple {entry table 190, entry 195} is instead mapped to the tuple {metadata block 550, transaction 2}. Thus, controller 130 may conveniently and efficiently determine the latest transaction for writing a given entry into the metadata block.

At 630, controller 130 may identify, according to determining that the transaction for writing the entry into metadata block 180-1 is the latest transaction for the entry, the entry as valid metadata of metadata block 180-1. In this way, controller 130 may determine all the entries in metadata block 180-1 that are written in by the latest transaction. All the entries constitute valid metadata of metadata block 180-1. At 640, controller 130 may determine a ratio of the valid metadata to all metadata in metadata block 180-1 as a valid metadata rate of metadata block 180-1.

Referring back to FIG. 3, at 320, controller 130 selects a predetermined number of metadata blocks having a valid metadata rate lower than a first valid metadata rate threshold from the plurality of metadata blocks 180-1 to 180-4, 550, and 560. In some embodiments, controller 130 may sort the valid metadata rates of the plurality of metadata blocks 180-1 to 180-4, 550, and 560, and select a predetermined number of metadata blocks having the lowest valid metadata rate, such as two metadata blocks having the lowest valid metadata rate. Assuming that the valid metadata rates of metadata blocks 180-1 to 180-4, 550, and 560 are 30%, 40%, 60%, 65%, 100%, and 100%, respectively, two metadata blocks 180-1 and 180-2 having the lowest valid metadata rate may be selected.

It can be understood that setting the predetermined number to 2 is merely for convenience of explanation. The predetermined number may be any suitable number, such as 32, that enables the compression process to proceed smoothly and has a limited impact on normal input and output operations.

Figure 7:
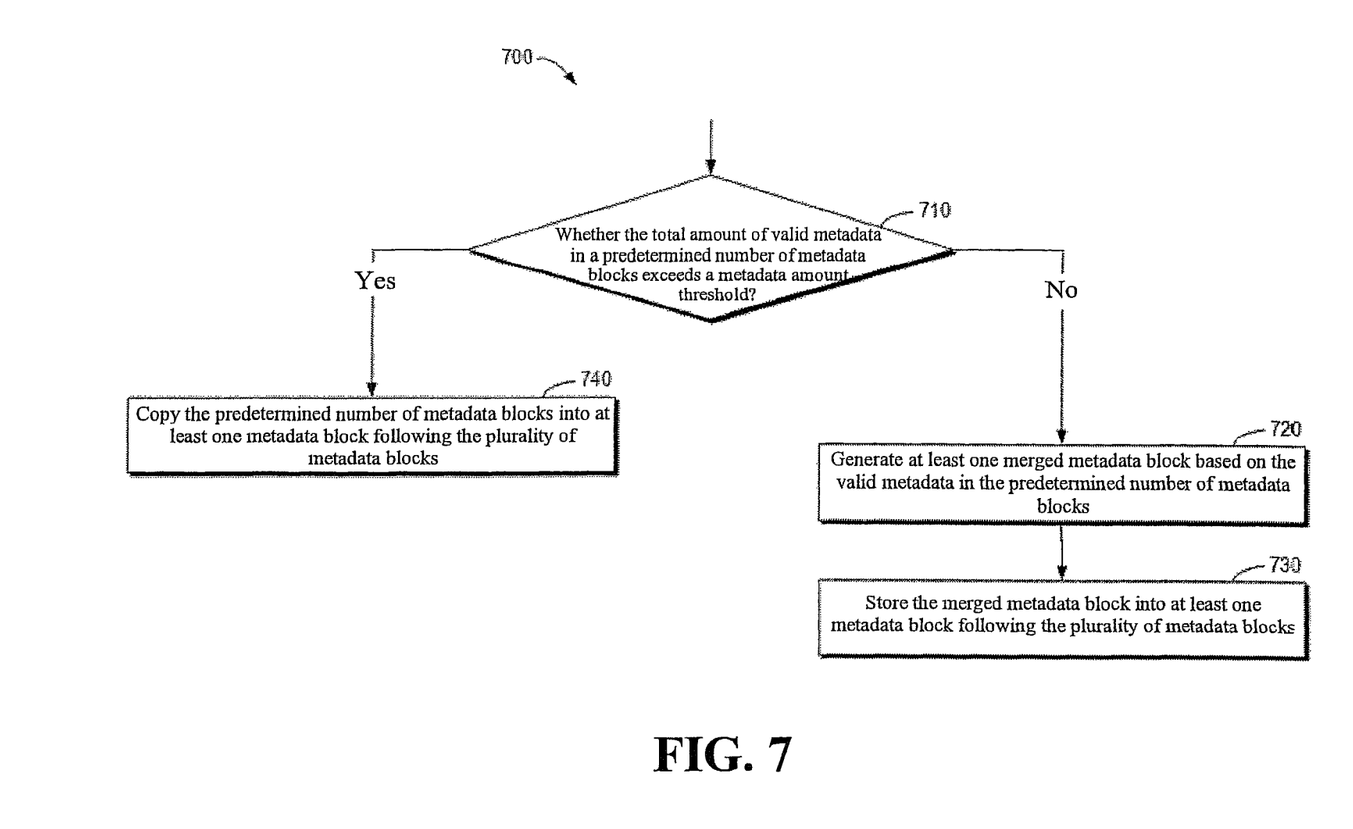
FIG. 7 shows a flowchart of a method for storing valid metadata according to some embodiments of the present disclosure.

At 330, controller 130 stores the valid metadata in the predetermined number of metadata blocks into at least one metadata block following the plurality of metadata blocks in metadata storage area 170. FIG. 7 shows a flowchart of method 700 for storing valid metadata according to some embodiments of the present disclosure. For example, method 700 may be carried out by controller 130 as shown in FIG. 1. It should be understood that method 700 may also include additional steps not shown and/or the steps shown may be omitted, the scope of the present disclosure being not limited in this respect.

At 710, controller 130 may compare the total amount of the valid metadata in the predetermined number of metadata blocks with a metadata amount threshold. For example, controller 130 may compare the total amount of the valid metadata in the predetermined number of metadata blocks 180-1 and 180-2 with a metadata amount threshold. For example, the metadata amount threshold may be the size of half of the predetermined number of metadata blocks, such as the size of one metadata block.

Figure 8:
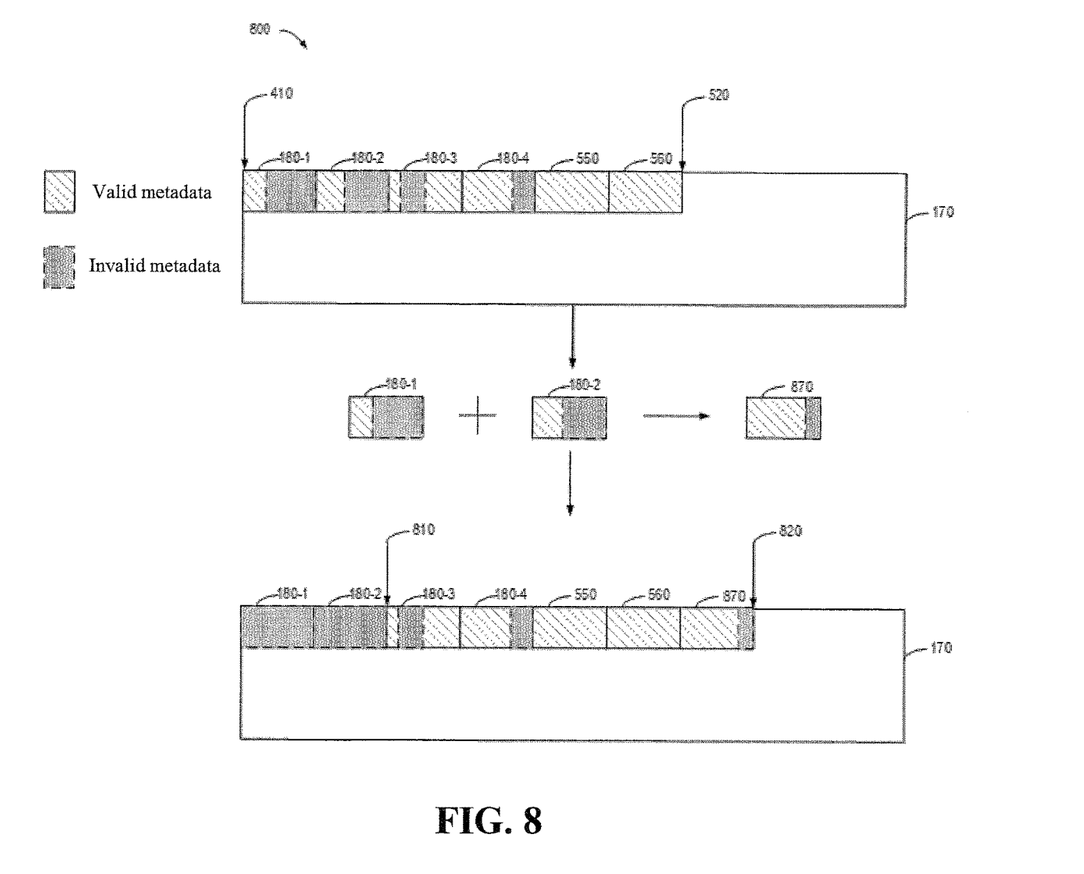
FIG. 8 shows a schematic diagram of an example of merging and storing valid metadata according to some embodiments of the present disclosure.

At 720, controller 130 may generate, according to the total amount of the valid metadata being lower than the metadata amount threshold, at least one merged metadata block based on the valid metadata in the predetermined number of metadata blocks. The number of the at least one merged metadata block is less than the predetermined number. FIG. 8 shows schematic diagram 800 of an example of merging and storing valid metadata according to some embodiments of the present disclosure. As shown in FIG. 8, controller 130 may generate, according to the total amount (e.g., the size of 70% of the metadata blocks) of the valid metadata in metadata blocks 180-1 and 180-2 being lower than a metadata amount threshold (e.g., the size of one metadata block), at least one merged metadata block 870 based on the valid metadata in metadata blocks 180-1 and 180-2.

At 730, controller 130 may store the at least one merged metadata block into at least one metadata block following the plurality of metadata blocks. As shown in FIG. 8, merged metadata block 870 is stored following metadata block 560.

Figure 9:
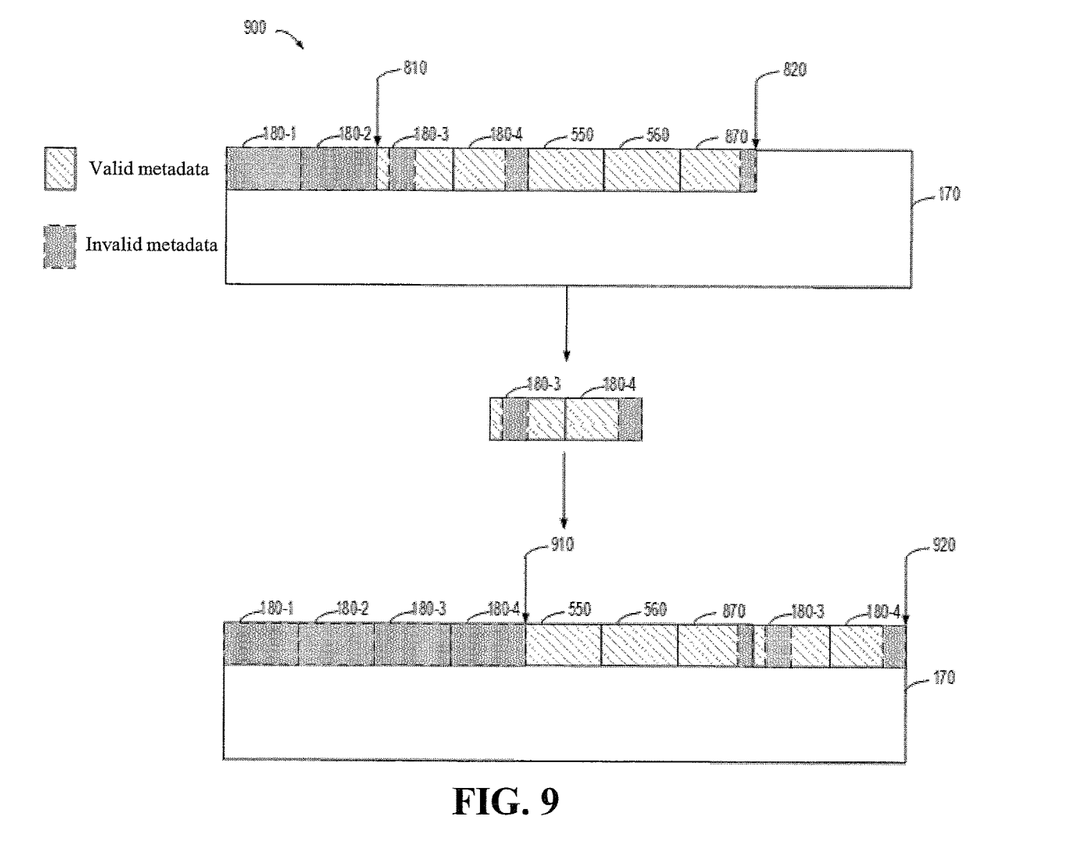
FIG. 9 shows a schematic diagram of an example of copying valid metadata according to some embodiments of the present disclosure.

Otherwise, at 740, controller 130 copies, according to determining that the total amount of the valid metadata exceeds the metadata amount threshold, the predetermined number of metadata blocks to a position following the plurality of metadata blocks. FIG. 9 shows schematic diagram 900 of an example of copying valid metadata according to some embodiments of the present disclosure. As shown in FIG. 9, after metadata blocks 180-1 and 180-2 are merged into metadata block 870, two metadata blocks having the lowest valid metadata rate are metadata blocks 180-3 and 180-4. Controller 130 copies, according to determining that the total amount of the valid metadata in metadata blocks 180-3 and 180-4 exceeds the metadata amount threshold, metadata blocks 180-3 and 180-4 to a position following metadata block 870.

Referring back to FIG. 3, at 340, controller 130 makes the valid metadata in the predetermined number of metadata blocks invalid. In an example shown in FIG. 8, original valid metadata in metadata blocks 180-1 and 180-2 is made invalid. Similarly, in an example shown in FIG. 9, original valid metadata in metadata blocks 180-3 and 180-4 is made invalid.

In some embodiments, controller 130 may also update, after storing the valid metadata in the predetermined number of metadata blocks into the at least one metadata block, a header address and a tail address pointing to metadata storage area 170 in address information stored in address storage area 150 for indexing metadata storage area 170, thereby realizing space recycling. For example, controller 130 may determine a starting metadata block, of which the valid metadata rate exceeds a second valid metadata rate threshold (e.g., 0), stored in metadata storage area 170, and update the header address to an address of the starting metadata block. As shown in FIG. 8, since the first starting metadata block having a non-zero valid metadata rate is metadata block 180-3, header address 410 pointing to metadata block 180-1 may be updated to header address 810 pointing to metadata block 180-3. Similarly, as shown in FIG. 9, since the first starting metadata block having a non-zero valid metadata rate is metadata block 550, header address 810 pointing to metadata block 180-3 may be updated to header address 910 pointing to metadata block 550.

In addition, controller 130 may determine an ending metadata block stored in metadata storage area 170 and update the tail address to an address of the ending metadata block. As shown in FIG. 8, since the ending metadata block is metadata block 870, tail address 520 pointing to metadata block 560 may be updated to tail address 820 pointing to metadata block 870. Similarly, as shown in FIG. 9, since the ending metadata block is metadata block 180-4, tail address 820 pointing to metadata block 870 may be updated to tail address 920 pointing to metadata block 180-4.

Controller 130 may iteratively perform method 300 until the utilization rate of metadata storage area 170 is lower than a stop utilization rate threshold (e.g., 40%). In this way, the compression process is divided into multiple iterations. Each iteration causes some valid metadata to be stored to the tail of metadata storage area 170, thereby causing the header address to advance by several data blocks while causing the tail address to shift back by several blocks. It can be seen that by storing only a small amount of metadata into metadata storage area 170 in each iteration, the utilization rate of metadata storage area 170 can be kept at a reasonable level (e.g., 40%-70%). Therefore, it is possible to conveniently and efficiently improve the performance of the storage system and reduce the loss of a disk (e.g., a solid-state drive SSD).

Figure 10:
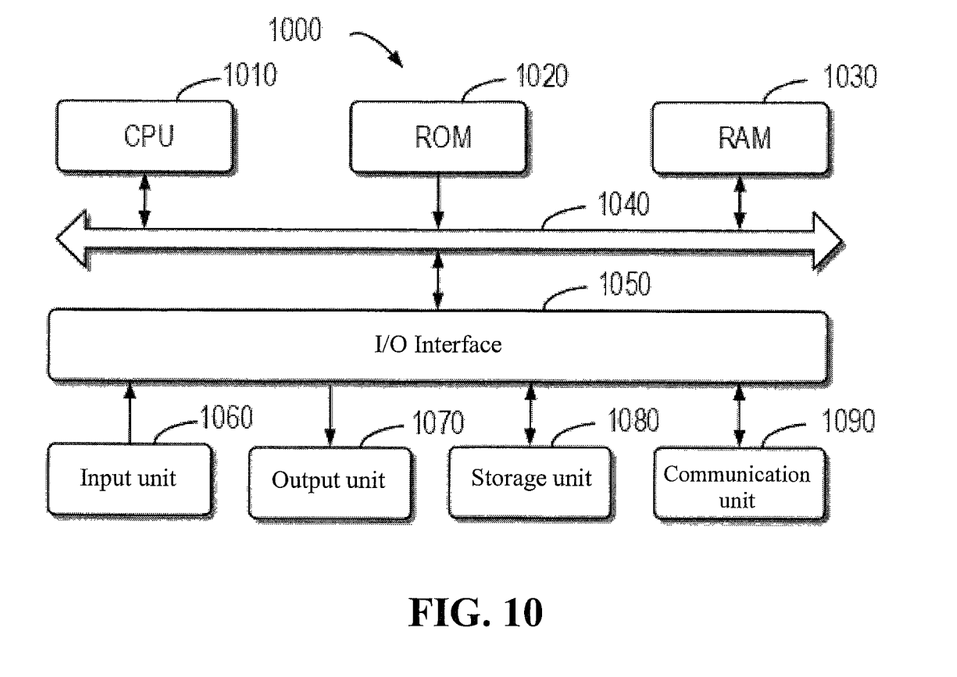
FIG. 10 shows a schematic block diagram of an example device that may be used to implement embodiments of the present disclosure.

FIG. 10 shows a schematic block diagram of an example device 1000 that may be used to implement embodiments of the present disclosure. For example, controller 130 as shown in FIG. 1 may be implemented by device 1000. As shown, device 1000 includes central processing unit (CPU) 1010 that may perform various appropriate actions and processing according to computer program instructions stored in read only memory (ROM) 1020 or computer program instructions loaded from storage unit 1080 to random access memory (RAM) 1030. In RAM 1030, various programs and data required for operations of device 1000 may also be stored. CPU 1010, ROM 1020, and RAM 1030 are connected to each other through bus 1040. Input/output (I/O) interface 1050 is also connected to bus 1040.

A plurality of components in device 1000 are connected to I/O interface 1050, including: input unit 1060, such as a keyboard or a mouse; output unit 1070, such as various types of displays or speakers; storage unit 1080, such as a disk or an optical disc; and communication unit 1090, such as a network card, a modem, or a wireless communication transceiver. Communication unit 1090 allows device 1000 to exchange information/data with other devices over a computer network such as the Internet and/or various telecommunication networks.

Various procedures and processing described above, such as methods 300, 600, and 700, may be performed by processing unit 1010. For example, in some embodiments, methods 300, 600, and 700 may be implemented as computer software programs that are tangibly included in a machine-readable medium, such as storage unit 1080. In some embodiments, some of or all the computer programs may be loaded and/or installed onto device 1000 via ROM 1020 and/or communication unit 1090. One or more actions of methods 300, 600, and 700 described above may be performed when the computer programs are loaded into RAM 1030 and executed by CPU 1010.

Embodiments of the present disclosure may refer to methods, apparatus, systems, and/or computer program products. In accordance with certain embodiments, the storage system 110 includes data storage equipment which performs I/O operations on behalf of one or more host computers or hosts. The computer program product may include a computer-readable storage medium on which computer-readable program instructions for performing various aspects of the present disclosure are loaded.

The computer-readable storage medium may be a tangible device that may retain and store instructions used by an instruction executing device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punched card or an in-groove raised structure with instructions stored thereon, and any suitable combination thereof. The computer-readable storage medium as used herein is not to be interpreted as transient signals themselves, such as radio waves or other freely propagated electromagnetic waves, electromagnetic waves propagating through waveguides or other transmission media (e.g., light pulses through fiber optic cables), or electrical signals transmitted through wires.

The computer-readable program instructions described herein may be downloaded from the computer-readable storage medium to various computing/processing devices or downloaded to an external computer or an external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing operations of the present disclosure may be assembly instructions, instruction set architecture (ISA) instructions, machine instructions, machine related instructions, microcode, firmware instructions, state setting data, or source code or object code written in any combination of one or more programming languages, including object-oriented programming languages such as Smalltalk or C++, as well as conventional procedural programming languages such as the "C" language or similar programming languages. The computer-readable program instructions may be executed entirely on a user computer, executed partly on the user computer, executed as a separate software package, executed partly on the user computer while executed partly on a remote computer, or executed entirely on the remote computer or a server. In the case where a remote computer is involved, the remote computer may be connected to the user computer through any kind of network, including a local area network (LAN) or a wide area network (WAN), or may be connected to an external computer (e.g., connected through the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit may execute the computer-readable program instructions to implement various aspects of the present disclosure.

Various aspects of the present disclosure are described herein with reference to flowcharts and/or block diagrams of the method, apparatus (system), and computer program product according to the embodiments of the present disclosure. It should be understood that each block of the flowcharts and/or block diagrams as well as combinations of the blocks in the flowcharts and/or block diagrams may be implemented by the computer-readable program instructions.

The computer-readable program instructions may be provided to a processing unit of a general-purpose computer, a special-purpose computer or other programmable data processing apparatuses, thereby producing a machine, such that when these instructions are executed by the processing unit of the computer or other programmable data processing apparatuses, an apparatus for implementing functions/actions specified in one or more blocks in the flowcharts and/or block diagrams is generated. The computer-readable program instructions may also be stored in the computer-readable storage medium. These instructions enable the computer, the programmable data processing apparatuses and/or other devices to operate in a specific manner, so that the computer-readable medium storing the instructions includes a manufactured product that includes instructions for implementing various aspects of functions/actions specified in one or more blocks in the flowcharts and/or block diagrams.

The computer-readable program instructions may also be loaded onto the computer, other programmable data processing apparatuses or other devices to perform a series of operational steps on the computer, other programmable data processing apparatuses or other devices to produce a computer-implemented process. Thus, instructions executed on the computer, other programmable data processing apparatuses or other devices implement functions/actions specified in one or more blocks in the flowcharts and/or block diagrams.

The flowcharts and block diagrams in the drawings illustrate the architecture, functions and operations of possible implementations of the system, method and computer program product according to various embodiments of the present disclosure. In this regard, each block in the flowcharts or block diagrams may represent a module, a program segment or part of an instruction that includes one or more executable instructions for implementing the specified logical functions. In some alternative implementations, the functions noted in the blocks may also occur in a different order from those illustrated in the drawings. For example, two consecutive blocks may actually be executed substantially in parallel, and they may sometimes be executed in a reverse order, depending upon the functions involved. It is also noted that each block in the block diagrams and/or flowcharts, as well as combinations of blocks in the block diagrams and/or flowcharts, may be implemented in a dedicated hardware-based system that performs the specified functions or actions, or may be implemented by a combination of dedicated hardware and computer instructions.

Various embodiments of the present disclosure have been described above, and the foregoing description is illustrative, not exhaustive, and is not limited to the disclosed embodiments. Many modifications and variations will be apparent to those of ordinary skill in the art without departing from the scope and spirit of the various illustrated embodiments. The selection of terms used herein is intended to best explain the principles and practical applications of various embodiments or technical improvements on technologies in the market or enable those of ordinary skill in the art to understand the various embodiments disclosed herein.

The invention claimed is:

1. A method for storage management, comprising:
   determining corresponding valid metadata rates of a plurality of metadata blocks stored in a metadata storage area of a storage system, the valid metadata rate of each metadata block indicating a ratio of valid metadata in the metadata block to all metadata in the metadata block;
   selecting a predetermined number of metadata blocks having a valid metadata rate lower than a first valid metadata rate threshold from the plurality of metadata blocks;
   storing valid metadata in the predetermined number of metadata blocks into at least one metadata block following the plurality of metadata blocks in the metadata storage area; and
   making the valid metadata in the predetermined number of metadata blocks invalid;
   wherein storing valid metadata in the predetermined number of metadata blocks into the at least one metadata block comprises:
   comparing the total amount of the valid metadata in the predetermined number of metadata blocks with a metadata amount threshold;
   generating, according to the total amount of the valid metadata being lower than the metadata amount threshold, at least one merged metadata block based on the valid metadata in the predetermined number of metadata blocks, the number of the at least one merged metadata block being less than the predetermined number; and
   storing the at least one merged metadata block into at least one metadata block following the plurality of metadata blocks.

2. The method of claim 1, wherein determining the corresponding valid metadata rates comprises:
   determining a utilization rate of the metadata storage area, the utilization rate indicating a ratio of a space in which metadata blocks are stored in the metadata storage area to the total space in the metadata storage area; and
   determining the corresponding valid metadata rates according to determining that the utilization rate exceeds a utilization rate threshold.

3. The method of claim 1, wherein the storage system comprises a plurality of storage strips providing redundant storage, metadata for the plurality of storage strips being stored in a memory in association with the storage system as a plurality of entries, each of the plurality of entries being written into at least one of the plurality of metadata blocks by at least one transaction, wherein determining the corresponding valid metadata rates comprises:
   for a given metadata block in the plurality of metadata blocks,
      determining at least one entry included in the given metadata block;
      identifying, according to determining that the transaction for writing the at least one entry into the given metadata block is the latest transaction for the at least one entry, the at least one entry as valid metadata of the given metadata block; and
      determining a ratio of the valid metadata to all metadata in the metadata block as a valid metadata rate of the given metadata block.

4. The method of claim 1, wherein storing valid metadata in the predetermined number of metadata blocks into the at least one metadata block further comprises:
   copying, according to determining that the total amount of the valid metadata exceeds the metadata amount threshold, the predetermined number of metadata blocks to a position following the plurality of metadata blocks.

5. The method of claim 1, further comprising:
   after storing valid metadata in the predetermined number of metadata blocks into the at least one metadata block, determining a starting metadata block, of which the valid metadata rate exceeds a second valid metadata rate threshold, stored in the metadata storage area;

updating a header address pointing to the metadata storage area in address information for indexing the metadata storage area to an address of the starting metadata block;

determining an ending metadata block stored in the metadata storage area; and updating a tail address pointing to the metadata storage area in the address information to an address of the ending metadata block.

6. The method of claim 1, wherein selecting the predetermined number of metadata blocks includes:

after the valid metadata rates have been determined, selecting metadata blocks having the lowest valid metadata rates until the predetermined number of metadata blocks has been selected.

7. The method of claim 6, further comprising:

after the valid metadata rates have been determined and prior to selecting the predetermined number of metadata blocks, sorting at least some of the valid metadata rates.

8. A device for storage management, comprising:

at least one processing unit; and at least one memory coupled to the at least one processing unit and storing instructions to be executed by the at least one processing unit, the instructions, when executed by the at least one processing unit, causing the device to perform an action, the action comprising:

determining corresponding valid metadata rates of a plurality of metadata blocks stored in a metadata storage area of a storage system, the valid metadata rate of each metadata block indicating a ratio of valid metadata in the metadata block to all metadata in the metadata block;

selecting a predetermined number of metadata blocks having a valid metadata rate lower than a first valid metadata rate threshold from the plurality of metadata blocks;

storing valid metadata in the predetermined number of metadata blocks into at least one metadata block following the plurality of metadata blocks in the metadata storage area; and making the valid metadata in the predetermined number of metadata blocks invalid;

wherein storing valid metadata in the predetermined number of metadata blocks into the at least one metadata block comprises:

comparing the total amount of the valid metadata in the predetermined number of metadata blocks with a metadata amount threshold;

generating, according to the total amount of the valid metadata being lower than the metadata amount threshold, at least one merged metadata block based on the valid metadata in the predetermined number of metadata blocks, the number of the at least one merged metadata block being less than the predetermined number; and storing the at least one merged metadata block into at least one metadata block following the plurality of metadata blocks.

9. The device of claim 8, wherein determining the corresponding valid metadata rates comprises:

determining a utilization rate of the metadata storage area, the utilization rate indicating a ratio of a space in which metadata blocks are stored in the metadata storage area to the total space in the metadata storage area; and determining the corresponding valid metadata rates according to determining that the utilization rate exceeds a utilization rate threshold.

10. The device of claim 8, wherein the storage system comprises a plurality of storage strips providing redundant storage, metadata for the plurality of storage strips being stored in a memory in association with the storage system as a plurality of entries, each of the plurality of entries being written into at least one of the plurality of metadata blocks by at least one transaction, wherein determining the corresponding valid metadata rates comprises:

for a given metadata block in the plurality of metadata blocks, determining at least one entry included in the given metadata block;

identifying, according to determining that the transaction for writing the at least one entry into the given metadata block is the latest transaction for the at least one entry, the at least one entry as valid metadata of the given metadata block; and determining a ratio of the valid metadata to all metadata in the metadata block as a valid metadata rate of the given metadata block.

11. The device of claim 8, wherein storing valid metadata in the predetermined number of metadata blocks into the at least one metadata block further comprises:

copying, according to determining that the total amount of the valid metadata exceeds the metadata amount threshold, the predetermined number of metadata blocks to a position following the plurality of metadata blocks.

12. The device of claim 8, the action further comprising:

after storing valid metadata in the predetermined number of metadata blocks into the at least one metadata block, determining a starting metadata block, of which the valid metadata rate exceeds a second valid metadata rate threshold, stored in the metadata storage area;

updating a header address pointing to the metadata storage area in address information for indexing the metadata storage area to an address of the starting metadata block;

determining an ending metadata block stored in the metadata storage area; and updating a tail address pointing to the metadata storage area in the address information to an address of the ending metadata block.

13. A computer program product tangibly stored in a non-transitory computer-readable medium and comprising machine-executable instructions that, when executed, cause a machine to perform an action, the action comprising:

determining corresponding valid metadata rates of a plurality of metadata blocks stored in a metadata storage area of a storage system, the valid metadata rate of each metadata block indicating a ratio of valid metadata in the metadata block to all metadata in the metadata block;

selecting a predetermined number of metadata blocks having a valid metadata rate lower than a first valid metadata rate threshold from the plurality of metadata blocks;

storing valid metadata in the predetermined number of metadata blocks into at least one metadata block following the plurality of metadata blocks in the metadata storage area; and making the valid metadata in the predetermined number of metadata blocks invalid;

wherein storing valid metadata in the predetermined number of metadata blocks into the at least one metadata block comprises:
  comparing the total amount of the valid metadata in the predetermined number of metadata blocks with a metadata amount threshold;
  generating, according to the total amount of the valid metadata being lower than the metadata amount threshold, at least one merged metadata block based on the valid metadata in the predetermined number of metadata blocks, the number of the at least one merged metadata block being less than the predetermined number; and
  storing the at least one merged metadata block into at least one metadata block following the plurality of metadata blocks.

14. The computer program product of claim 13, wherein determining the corresponding valid metadata rates comprises:
  determining a utilization rate of the metadata storage area, the utilization rate indicating a ratio of a space in which metadata blocks are stored in the metadata storage area to the total space in the metadata storage area; and
  determining the corresponding valid metadata rates according to determining that the utilization rate exceeds a utilization rate threshold.

15. The computer program product of claim 13, wherein the storage system comprises a plurality of storage strips providing redundant storage, metadata for the plurality of storage strips being stored in a memory in association with the storage system as a plurality of entries, each of the plurality of entries being written into at least one of the plurality of metadata blocks by at least one transaction, wherein determining the corresponding valid metadata rates comprises:
  for a given metadata block in the plurality of metadata blocks,
    determining at least one entry included in the given metadata block;
    identifying, according to determining that the transaction for writing the at least one entry into the given metadata block is the latest transaction for the at least one entry, the at least one entry as valid metadata of the given metadata block; and
    determining a ratio of the valid metadata to all metadata in the metadata block as a valid metadata rate of the given metadata block.

16. The computer program product of claim 13, wherein storing valid metadata in the predetermined number of metadata blocks into the at least one metadata block further comprises:
  copying, according to determining that the total amount of the valid metadata exceeds the metadata amount threshold, the predetermined number of metadata blocks to a position following the plurality of metadata blocks.

17. The computer program product of claim 13, the action further comprising:
  after storing valid metadata in the predetermined number of metadata blocks into the at least one metadata block,
    determining a starting metadata block, of which the valid metadata rate exceeds a second valid metadata rate threshold, stored in the metadata storage area;
    updating a header address pointing to the metadata storage area in address information for indexing the metadata storage area to an address of the starting metadata block;
    determining an ending metadata block stored in the metadata storage area; and
    updating a tail address pointing to the metadata storage area in the address information to an address of the ending metadata block.

18. A method for storage management, comprising:
  determining corresponding valid metadata rates of a plurality of metadata blocks stored in a metadata storage area of a storage system, the valid metadata rate of each metadata block indicating a ratio of valid metadata in the metadata block to all metadata in the metadata block;
  selecting a predetermined number of metadata blocks having a valid metadata rate lower than a first valid metadata rate threshold from the plurality of metadata blocks;
  storing valid metadata in the predetermined number of metadata blocks into at least one metadata block following the plurality of metadata blocks in the metadata storage area;
  making the valid metadata in the predetermined number of metadata blocks invalid; and
  after storing valid metadata in the predetermined number of metadata blocks into the at least one metadata block,
    determining a starting metadata block, of which the valid metadata rate exceeds a second valid metadata rate threshold, stored in the metadata storage area;
    updating a header address pointing to the metadata storage area in address information for indexing the metadata storage area to an address of the starting metadata block;
    determining an ending metadata block stored in the metadata storage area; and
    updating a tail address pointing to the metadata storage area in the address information to an address of the ending metadata block.

19. A method for storage management, comprising:
  determining corresponding valid metadata rates of a plurality of metadata blocks stored in a metadata storage area of a storage system, the valid metadata rate of each metadata block indicating a ratio of valid metadata in the metadata block to all metadata in the metadata block;
  selecting a predetermined number of metadata blocks having a valid metadata rate lower than a first valid metadata rate threshold from the plurality of metadata blocks;
  storing valid metadata in the predetermined number of metadata blocks into at least one metadata block following the plurality of metadata blocks in the metadata storage area; and
  making the valid metadata in the predetermined number of metadata blocks invalid;
wherein selecting the predetermined number of metadata blocks includes:
  after the valid metadata rates have been determined, selecting metadata blocks having the lowest valid metadata rates until the predetermined number of metadata blocks has been selected.

20. The method of claim 19, further comprising:
  after the valid metadata rates have been determined and prior to selecting the predetermined number of metadata blocks, sorting at least some of the valid metadata rates.

* * * * *